Sept. 25, 1945. V. WEBER 2,385,433
THERMOSTAT
Filed Dec. 23, 1938 3 Sheets-Sheet 1

INVENTOR
Victor Weber

Sept. 25, 1945.     V. WEBER     2,385,433
THERMOSTAT
Filed Dec. 23, 1938     3 Sheets-Sheet 2

INVENTOR
Victor Weber

Sept. 25, 1945. V. WEBER 2,385,433
THERMOSTAT
Filed Dec. 23, 1938 3 Sheets-Sheet 3

INVENTOR
Victor Weber

Patented Sept. 25, 1945

2,385,433

UNITED STATES PATENT OFFICE 2,385,433

THERMOSTAT

Victor Weber, St. Louis, Mo., assignor to American Thermometer Company, St. Louis, Mo., a corporation of Delaware Application December 23, 1938, Serial No. 247,390

36 Claims. (Cl. 219—20)

The present invention relates generally to heating appliances and more particularly to thermostatically actuated devices for controlling the operation of the apparatus used for controlling the supply of heat to the appliance. The present invention is particularly adapted for the control of electric ranges or the like where two different heating elements are provided for supplying the heat to the range. The invention will be described as applied to electric ranges having a resistance element for supplying heat for carrying out broiling operations and another resistance element for supplying heat for the carrying out of baking operations.

At the present time ranges which are equipped with a bake element and a broil element have a selector switch in addition to the thermostat which controls the temperature. The selector switch may be utilized for connecting either the bake element or the broil element or both to the current source. Where both elements are connected to the current source at one time the thermostat will operate to throw both of these elements simultaneously in and out of the circuit, or where one of the elements is placed in the circuit by the selector switch that element only will be thrown in or out of operation by the thermostat. In the operation of such a device it is particularly desirable at times to preheat the oven before placing the food in it. In such cases it is desirable to bring the temperature of the oven up to the appropriate cooking temperature relatively rapidly and in order to do this it is necessary to operate the selector switch so that both heating elements will be placed in the electric circuit. After the desired temperature is reached the food to be cooked may then be placed in the oven and the selector switch manually turned to either the "bake" position or to the "broil" position, whichever is desired. In any event it is necessary for the operator to remember that the selector switch has to be manually turned to the proper position after the temperature has been rapidly brought up to the desired point. If the operator forgets to make this adjustment the food being cooked may be spoiled. It will be readily appreciated that the two operations necessary in order to carry out a cooking operation of this character are spaced apart a substantial period of time. This is objectionable because the operator may fail to make the necessary adjustment. It is therefore desirable to provide a structure in which the two operations can be combined. That is to say, it is desirable to provide a structure which can be set once only for the purpose of carrying out the desired heating. By the present invention I provide a structure in which the entire mechanism is operated by a single control dial. By the structure which I provide it is only necessary to appropriately position the dial at the outset and thereafter the entire desired cooking operation can be carried out without the necessity of further adjustment of the selector switch and without any further adjustment of the thermostat itself.

In the structure which I provide by the present invention I have combined a thermostat, a switch to control the broil element and a switch to control the bake element in such a manner that with the operation of a single adjusting dial it is possible to accomplish everything which could formerly be accomplished only by the provision of a thermostat and a separate selector switch, each having its own operating handle. In the operation of the structure which I provide, if it is desired to bring the temperature of the oven up to the desired working temperature very rapidly, the adjusting dial can be rotated so as to cause the broil switch and the bake switch to be placed in the electric circuit and to then set the thermostat by mere reverse rotation to the appropriate temperature desired. The heating of the oven will continue with both the broil and bake elements in the circuit until the desired temperature has been reached. At that time the thermostat will have sufficiently responded to the temperature in the oven to operate the switches. The thermostat will then cause the broil switch to be thrown out and at substantially the same time the main thermostatic switch will be thrown out to break the circuit entirely. The broil switch then stays out of contact so that when the oven cools down below the desired temperature only the bake element will be in the circuit and the cooking will continue in this way. If it is unnecessary to obtain a rapid build-up to the desired temperature the thermostat adjusting dial can merely be rotated to the desired setting and the bake element alone will be in the circuit. When the temperature reaches the desired point the thermostat will operate to break the circuit without affecting the broil element so that upon the cooling down of the oven to slightly below the setting the thermostatic switch will be again actuated and the heating continued with only the bake element in the circuit. If it is desired to broil, the dial is turned to the "broil" position and this causes the broil element only to be connected to the current supply. The dial is permitted to remain in this position during the operation and the thermostat makes and breaks the main thermostatic switch connections so as to prevent the temperature in the oven from exceeding a safe broiling temperature. As the dial is turned to the "broil" position the bake switch, which is normally urged into current-carrying position, is moved away from the fixed contacts so as to break the circuit to the bake element. The bake element will remain out of contact so long as the adjusting dial is permitted to remain at the "broil" position. Immediately upon turning the dial from the "broil" position the bake element is automatically brought into the electric circuit again. It will be apparent that both the broil and bake elements will then be in the circuit at the same time. It will also be apparent that by using a single control dial the appropriate switches may be selected and the appropriate thermostatic setting obtained. This is accomplished by a single operation of the adjusting dial at the start of the cooking operation.

In the accompanying drawings I have shown for purposes of illustration only a preferred embodiment of my invention.

In the drawings—

In the embodiment shown in the drawings, the operating levers are mounted in a housing 2 having a front cover 3 and a back plate or cover 4. The bake switch is not mounted within the main housing 2 but is mounted in a supplemental housing 5 which is carried by the main housing 2. The front cover of the main housing has an opening 6 through which the threaded screw 7 extends. This screw cooperates with the adjusting dial 8 for adjusting the device and for setting the various switch elements so as to operate in the desired manner.

The threaded adjusting screw 7 is supported on a bushing 9 which is rigidly secured to the front cover 3. This bushing is interiorly threaded for cooperation with the adjusting screw 7 so that the screw will move inwardly or outwardly as it is rotated by the adjusting dial 8. The inner end of the screw engages a stud 10 which is attached to the expansible and contractible diaphragm 11. The interior of the diaphragm 11 is in communication with a capillary tube 12 which, in turn, is in communication with the interior of the bulb which is positioned in the oven or other chamber, the temperature of which is being controlled. A contractible and expansible liquid is provided in the bulb and the capillary tube 12 so that upon expansion of the liquid as a result of the heat to which the bulb is subjected the liquid will be forced through the tube into the expansible and contractible diaphragm 11, thereby actuating the diaphragm to a sufficient extent to operate the parts to be described for shutting off the supply of current to the oven. A tip 13 is provided on the face of the diaphragm opposite the stud 10 to facilitate the transmission of the expansive forces of the diaphragm to the operating levers.

The tip 13 abuts a button 14 in the recessed portion 15 of the operating lever 16. The operating lever 16 has a knife edge 17 at its upper end. This knife edge is seated in a V-shaped bearing 18 in a bracket 19 which is secured to the rear wall 4 of the main housing. This bracket 19 is provided with two arms 20 which extend forwardly from the rear wall and which carry the V-shaped bearings with which the knife edge 17 cooperates. The lower end of the operating lever 16 has laterally extending legs 21 which are provided with semi-circular knife edges 22. The knife edge bearings cooperate with tension springs 23. A contact arm 25 which is R-shaped in general configuration has openings 24 therein. The upper end of each tension spring is hooked through one of said openings. The openings 24 are provided with inner knife edges 26 which the upper ends of the springs 23 engage.

Each leg of the contact arm 25 has a knife edge 27. The knife edges 27 rest in V-shaped bearings 28 formed in a bracket 29. The bearings 28 are located in upstanding arms 30 of the bracket 29, the arms being spaced apart to permit the extension of the lever 16 downwardly between them. One end of the bracket 29 is provided with hooks 31 which extend through small openings in the rear wall of the main housing, the hooks seating on the lower surfaces of the openings. The other end of the bracket 29, the forward end, is supported in appropriate position by a screw 32. This screw is threaded in the bracket and the bottom end of the screw rests upon the bottom of the housing. The forward end of the bracket 29 is normally spaced above the bottom of the housing and it can be adjusted vertically by adjustment of the screw 32 so as to adjust the operation of the levers.

A take-up arm 38 of inverted V-shape in general configuration is provided for cooperation with the contact arm 25. The legs 39 of the take-up arm are provided at their lower ends with projections or bearings 40 which extend outwardly from the general plane of the take-up lever. These bearings 40 on the take-up arm 38 rest on inwardly projecting ledges or bearings 41 formed on the contact arm 25. The upper end of the take-up arm 38 extends above the upper end of the contact arm 25 and carries an insulating bar 42. This insulating bar is mounted on the upper end of the take-up arm in such a way as to permit a slight pivoting in a horizontal plane. This facilitates the alinement of the contact bridges 43, which are carried by the insulating bar. The contact bridges 43 cooperate with the contacts 44, 45, 46 and 47 which are supported on the insulating block 48 supported on the rear wall 4 of the main housing. The block 48 also carries an insulating plate 49 which extends downwardly behind the take-up arm 38 and limits the movement thereof in a contact breaking direction.

The take-up arm 38 is provided with a hook 50 which extends around the underside of the top cross-piece of the contact arm 25. This hook 50 limits the movement of the take-up arm in respect to the contact arm 25. A spring 51 normally urges the take-up arm toward the contact arm. One end of the spring abuts the rear face of the take-up arm and the other end abuts a washer 52 carried by the stud 53, which is carried by the contact arm at its upper end.

Figures 4, 7:
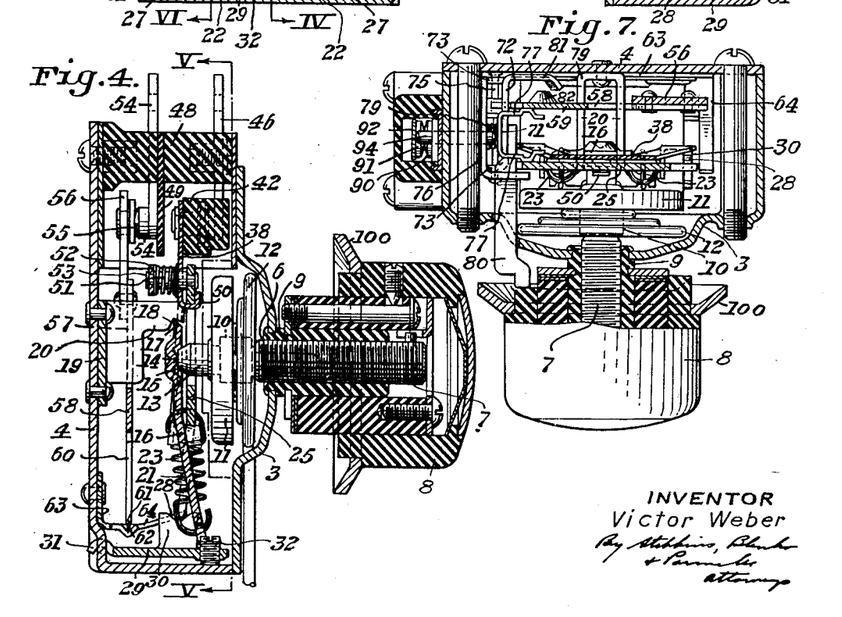
Figure 4 is a section taken along the line IV—IV of Figure 1.
Figure 7 is a section taken along the line VII—VII of Figure 5.

It will be seen from the above description that as the liquid in the bulb and in the capillary tube 12 expands in response to the temperatures prevailing in the oven the diaphragm 11 will expand and this will force the lower end of the thermostatically actuated lever 16 past the pivot point of the contact arm and due to the spring tension the contact arm and the take-up arm will be moved to the left as viewed in Figure 4, thus breaking the contact between the contact bridges 49 and the contacts 44, 45, 46 and 47, thereby interrupting the flow of current to the heating element. So long as the diaphragm 11 remains in the expanded position, the current will be interrupted but upon cooling down of the oven the diaphragm will contract and as soon as the lower end of the lever 16 passes the pivot point in the other direction the contact arm and the take-up arm will be moved to the right as viewed in Figure 4 so that the current will again be permitted to pass through the heating element so long as the circuit is not interrupted elsewhere.

Contacts 54 are connected in the circuit of the broil element. A contact bridge 55 bridges the contacts 54 when in the position shown in Figure 3. The bridge 55 is carried on the insulated extension 56 of arm 57 of the broil lever 58. The broil lever 58 is H-shaped in general configuration and is provided with the arm 57 and another upstanding arm 59. It is also provided with leg portions 60 which carry knife edges 61 at their lower ends. The knife edges 61 seat in V-shaped bearings 62 formed in a bracket 63 mounted on the rear wall 4 of the main housing. The bearings 62 are in spaced legs 64 of the bracket 63. These legs extend horizontally beyond the bearings 62 and the legs 60 of the broil lever 58 and their outer ends are positioned adjacent the legs of the contact arm 25 for the purpose of preventing the legs from sliding sidewise from their bearings. The arm 59 of the broil lever is provided with a tapered depression 65 which cooperates with a cone-shaped disk 66. One end of a spring 67 abuts the disk 66 and the other end of this spring carries a similar disk 68 which cooperates with a depression 69 in a bracket 70 carried by the rear wall 4 of the main housing. The spring 67 is normally under compression and, consequently, it will maintain the broil lever 58 in any position to which it is moved on either side of the pivot on which it is mounted. When the upper end of the broil lever is moved past the pivot point to the right as shown in Figure 4 the spring arrangement just described will operate to snap the contact bridge 55 into engagement with the contacts 54 so as to permit current to pass to the broil element. If the broil lever is moved to the left as viewed in Figure 4 a sufficient distance to pass the pivot point then the spring arrangement will serve to hold the broil lever away from the contacts 54, thus maintaining in an interrupted state the electric circuit leading to the broil element.

The broil lever and the contact arm are operatively connected together in such a manner that the broil lever may or may not be affected by the operation of the contact arm, as desired. Appropriate connections are also provided between the broil switch, the dial and the bake switch, to be described, to permit manual setting of the switches and thermostatic actuation of the broil switch in any desired manner.

An operating link 71 is pivotally mounted on a resetting link 72. The resetting link 72 is provided with horizontally extending arms 73 which are provided with openings 74 cooperating with a pivot pin 75 carried by the bracket 76 which, in turn, is carried by the rear wall 4 of the main housing. The operating link 71 is provided with laterally extending spaced arms 77. Each arm 77 has a raised portion 78. The arms 77, including the raised portions 78, normally extend between the broil lever 58 and the contact arm 25. The resetting link 72 is normally forced toward the contact arm and the broil lever by a spring 79, one end of which abuts the bracket 76. The distance between the raised portions of the arms 77 of the operating link is approximately the same distance as the distance between the adjacent faces of the contact arm 25 and the broil lever 58 when the contact bridges 43 and 55 engage their respective contacts. If the broil lever is in the position where the contact bridge therefor engages its contacts and the temperature in the oven reaches the desired setting, the movement of the contact arm so as to move the main bridges 43 away from their respective contacts will also operate through the operating link 71 to move the broil lever to a position where the contact arm carried thereby is separated from the contacts. The broil lever will then remain in that position until manually moved to a position reestablishing the broil circuit irrespective of the operation of the main contact arm.

The broil lever is manually moved into a position to establish the broil circuit by means of the resetting link 72 and the operating bar 80. The resetting link 72 has a horizontally extending arm 81 thereon which is adapted to cooperate with a cup 82 carried on the arm 59 of the broil lever. As the resetting link is rocked on its pivot the arm 81 engages the cup 82 and slides along the face thereof and forces the broil element into its forward position where the contact bridge engages the contacts. The resetting link is provided with an ear 83 which cooperates with the sloping surface 84 on the operating bar 80. As this bar is pushed inwardly by the rotation of the dial the face 84 slides over the ear 83 and rocks the resetting link on its pivot thereby forcing the broil lever forward. By virtue of the toggle arrangement described above the broil lever will remain in this position until moved therefrom.

If the operating bar 80 is held in, the resetting link and the operating link 71 carried thereby will be held in their outer position. In this position the ends 85 of the arms 77 of the operating link which project beyond the raised surfaces 78 will still be between the contact arm 25 and the arm 59 of the broil lever, the arms of the operating link being made sufficiently long to assure this. In this position the contact arm 25 can be actuated by the diaphragm and the actuating lever without moving the broiling lever from "closed" position. The extensions 85 of the arms 77 of the operating link are spaced sufficiently far apart to permit movement of the contact arm without corresponding movement of the broil lever. The contact arm can therefore be actuated so as to break the circuit without disturbing the contact between the bridge 55 and the contacts 54.

If the operating bar 80 is released after having been pushed in so as to move the broil lever into contact position the spring 79 will force the resetting link, the bar and the operating link back into normal position. If the diaphragm thereafter moves the contact arm in response to an increase in temperature the movement of the contact arm will cause the broil lever to move in a direction to break the broil circuit.

As stated above, the supplemental housing 5 which is mounted on one side of the main housing 2 houses the contacts for the bake element. A contact 90 is mounted on a terminal extending into the supplemental housing and its cooperating contact 91 is mounted on a contact arm 92 which is in the form of a flat spring. The contact arm 92 is secured to the supplemental housing and cooperates with a terminal 93. The spring contact arm 92 is arranged so that it will normally hold the contacts 90 and 91 together so as to maintain the electric circuit to the bake element closed. This circuit is broken by means of an operating pin 94 which extends from the main housing into the supplemental housing. One end of this pin abuts the contact arm 92 and the other end thereof bears against the resetting link. As the resetting link is rocked on its pivot by the bar 80 it pushes the pin 94 to the left as viewed in Figure 5 and the movement of the pin 94 moves the contact arm 92. If the bar 80 is moved in and held in, the contacts 90 and 91 will remain apart so that the broil element only will receive heating current. If the operating bar 80 is released the pin 94 will then move to the left and the contacts 90 and 91 will again bear against each other and both the bake and broil elements will receive heating current until the diaphragm has been expanded to a sufficient extent to move the broil lever in the manner described above.

Figure 17:
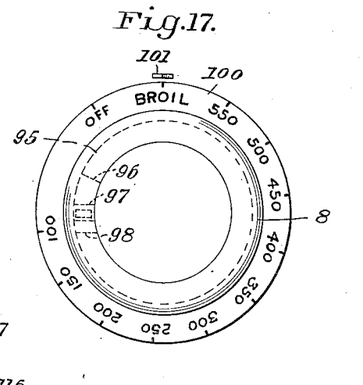
Figure 17 is a front elevation of the adjusting dial shown in Figure 16.
Figure 18:
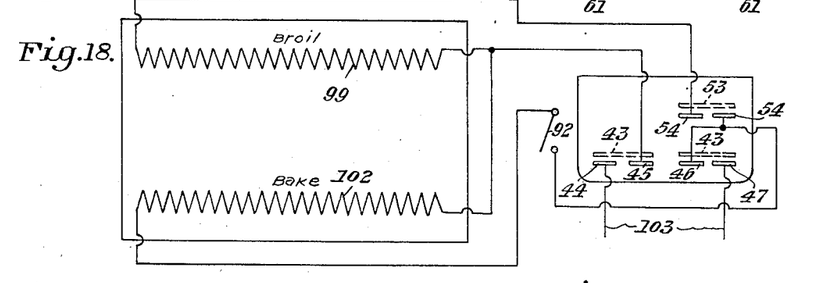
Figure 18 is a wiring diagram showing the electrical connections for the structure shown in Figures 1 to 17, inclusive.

The operating bar 80 is moved in one direction by the adjusting dial and in the other direction by the resetting link 72. This bar extends toward the dial from the main housing. The outer end thereof cooperates with the cam surface 95 on the inner end of the dial. As the dial is rotated from the "off" position to a point just above the 550° mark, the dial does not move the bar 80 at all. If the dial is moved to the "broil" position then the end of the bar 80 slides along the sloping face 96 of the adjusting dial to the horizontal, raised face 97. The movement of the bar 80 by the sloping face 96 and the raised surface 97 operates the broil lever and the bake contact arm 92 in the manner just described. A stop 98 is provided to prevent the dial from being rotated past the appropriate broiling setting. The stop 98 will be appropriately positioned with respect to the markings on the dial and the pointer 101 so as to prevent the dial from being rotated to the "off" position in a clockwise direction. The off position can be reached only by rotating the dial in a counter-clockwise direction as shown in Figure 17. The stop 98 also prevents rotation of the dial past the "off" position when rotated in a counter-clockwise direction.

Figure 5:
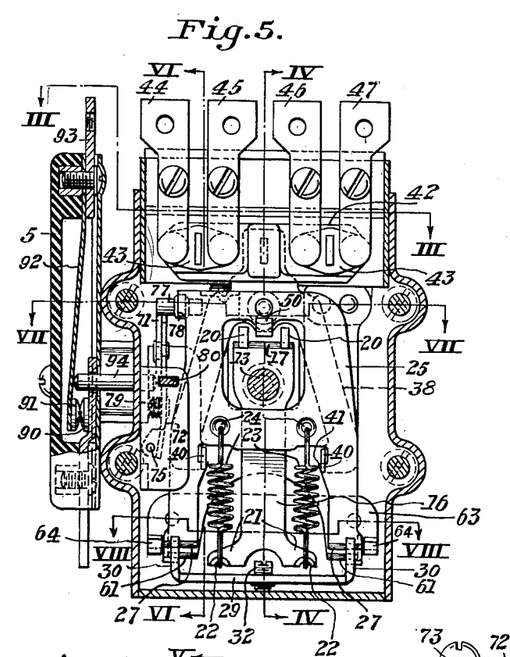
Figure 5 is a section taken along the line V—V of Figure 4.
Figure 6:
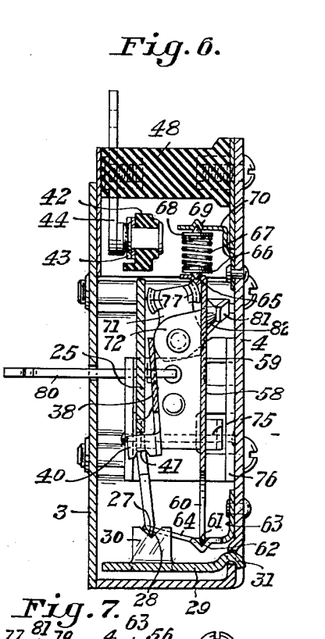
Figure 6 is a section taken along the line VI—VI of Figure 5.
Figure 9:
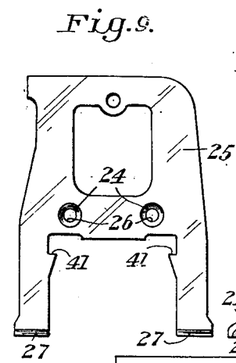
Figure 9 is a detail view in front elevation of the contact arm operated by the thermostatically actuated operated lever.
Figures 10, 11:
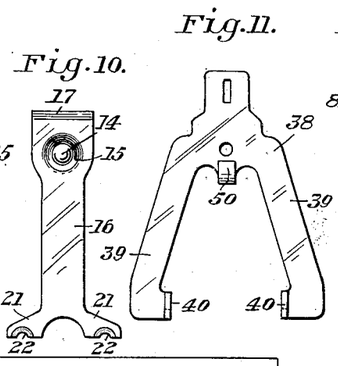
Figure 10 is a front elevation of the thermostatically actuated lever.
Figure 11 is a front elevation of the take-up arm which cooperates with the contact arm.
Figure 12:
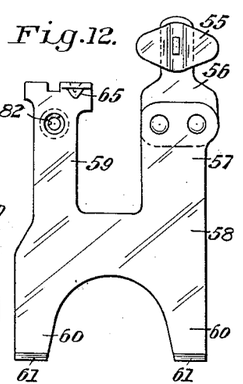
Figure 12 is a front elevation of the broil lever.
Figure 16:
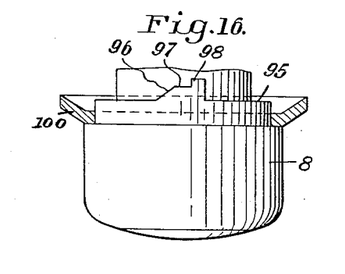
Figure 16 is a side view, partly in section, of the adjusting dial.

In the operation of this structure if it is desired to utilize the broil element 99 only the adjusting dial will be turned from the "off" position to the point where the marking "Broil" on the rim 100 of the dial 8 is opposite the pointer 101 carried by either the main housing or the panel of the stove upon which the device is mounted. In the rotation of the dial to this position the bar 80 will be forced inwardly by the elevated portions 96 and 97 of the dial and this will, in turn, rock the resetting link so as to operate the switch in the broil circuit which includes the contact bar 55 and the contacts 54. These parts are brought together. At the same time the rocking of the resetting link forces the pin 94 to the right as shown in Figure 5 and this operates the bake element switch, breaking the contacts 90 and 91. If the compartment or oven is cold at the time this setting is effected or the temperature thereof is not up to broil temperature, the rotation of the dial from the "off" position toward the "broil" position will also operate the main thermostat switches, bringing the contact bars 43 into engagement with the contacts 44 to 47, inclusive. When the compartment or oven reaches unsafe temperatures, the main thermostat switches will operate to break the circuit. The broil switch will not be operated along with the operation of the main thermostat switch as the retention of the adjusting dial at the "broil" position holds the resetting link in its outer position and withdraws the raised portions 78 on the arms 77 of the operating link to a position away from the contact arm and the broil lever.

If it is desired to operate the bake element 102 only the adjusting dial is turned from the "off" position to the desired temperature, say, 400°. Rotation of the dial will not operate to close the broil switch as the dial is not moved sufficiently far to accomplish this. The main thermostat switch will, however, close and as the bake switch 92 is normally closed current will be supplied from the current source 103 to the bake element until the temperature reaches 400°. The diaphragm will then have expanded to a sufficient extent to operate the thermostatic lever 16 to cause the contact arm to operate the main thermostat switch and break the circuit. When the temperature of the compartment or oven drops to slightly below 400° the contraction of the diaphragm will then function to close the main thermostat switch. During an operation of this character the bake switch is constantly maintained closed.

If it is desired to use the bake element only during the cooking operation but to nevertheless bring the compartment or oven temperature rapidly up to the desired temperature, the adjusting dial is moved for the "off" position to the "broil" position. This movement of the adjusting dial or handle operates to close the main thermostat switch and the broil switch. It also operates to open the bake switch. Immediately after turning the dial to the "broil" position the operator turns the dial back to the desired temperature setting, say 400°. The rotation of the dial back to this point does not disturb the broil switch but it does permit the switch in the bake circuit to close and reestablish the bake circuit. The broil switch, the bake switch, and the main thermostat switch are all closed and the heating will continue until the desired temperature of 400° is reached. The expansion of the diaphragm will operate to open the main thermostat switch and the movement thereof will also function to open the broil switch. The bake switch is not operated at this time but remains closed. However, the current through the bake element 102 has been interrupted by the opening of the main thermostat switch and current will not again be supplied to the bake element until the temperature drops to just below 400° at which time the thermostat switch will close.

Figure 19:
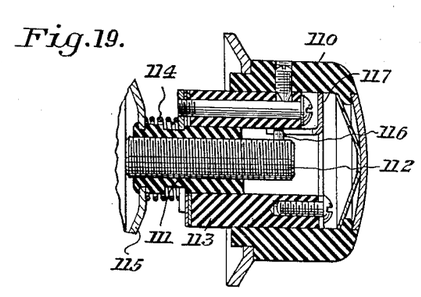
Figure 19 is a longitudinal sectional view through an adjusting dial embodying a modification of the structure shown in Figures 1 to 18, inclusive.

In order to obviate the necessity of turning the dial first to the "broil" position and then back to the desired temperature setting in order to obtain a rapid build-up of the temperature in the compartment or oven, a modified structure can be utilized. In Figure 19 I have shown an arrangement which will make it unnecessary to go through the operation just described in order to obtain a rapid build-up. As shown in Figure 19 the dial 110 is mounted on the bushing 111. This bushing is interiorly threaded for cooperating with the adjusting screw 112. The dial 110 and the sleeve 113 are arranged so that they will slide axially along the bushing 111 when axial pressure is applied to the dial. The dial is normally urged toward the right as shown in Figure 19 by a compression spring 114. When axial pressure is applied to the dial it will be moved along the bushing toward the front cover plate 115 and this movement will operate the bar 80 which, in turn, will close the broil circuit. The adjusting screw is provided with a pin 116 which cooperates with a forked member 117 carried by the main portion of the dial. The forks in this embodiment are made sufficiently long to permit the axial movement of the dial relative to the adjusting screw 112. It will be evident that with this arrangement in order to obtain a rapid build-up of the oven temperature it is only necessary to push in the dial, which can be accomplished at any temperature setting above room temperature, and to turn it to the desired temperature setting.

In the embodiment shown in the drawings the bake switch is positioned to one side of the main housing. It will be evident, however, that this switch can be positioned on the back instead of on the side, and that the switch can be actuated directly by the bar which operates the broil switch instead of being actuated by the resetting link and the pin which cooperates therewith. The bar can be extended rearwardly and in a double pole construction could bear against an insulator extending between the two spring elements of the switch.

It will be evident from what has been stated above that the structure which I provide gives thermostatic operation of the broil switch and that both the broil and the bake elements can be employed at the same time and that appropriate thermostatic control is provided for their proper operation.

Figure 1:
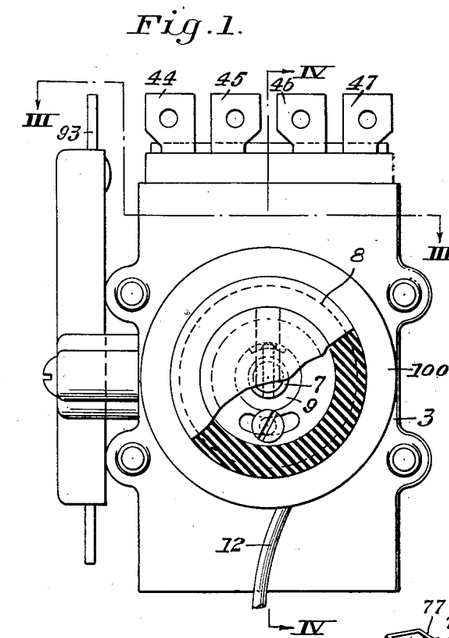
Figure 1 is a front elevation of the structure which I provide with a portion of the dial plate broken away.
Figure 2:
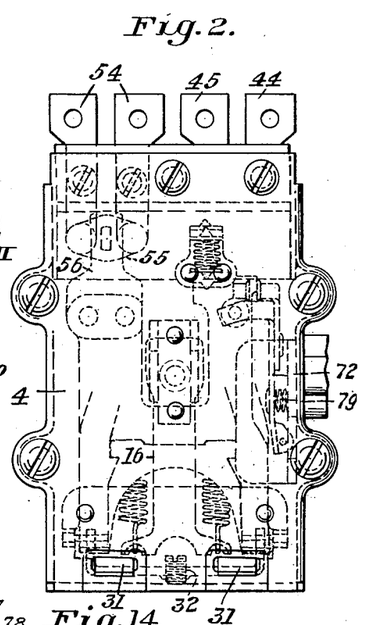
Figure 2 is a rear view of the structure shown in Figure 1.
Figures 3, 8, 13, 14, 15:
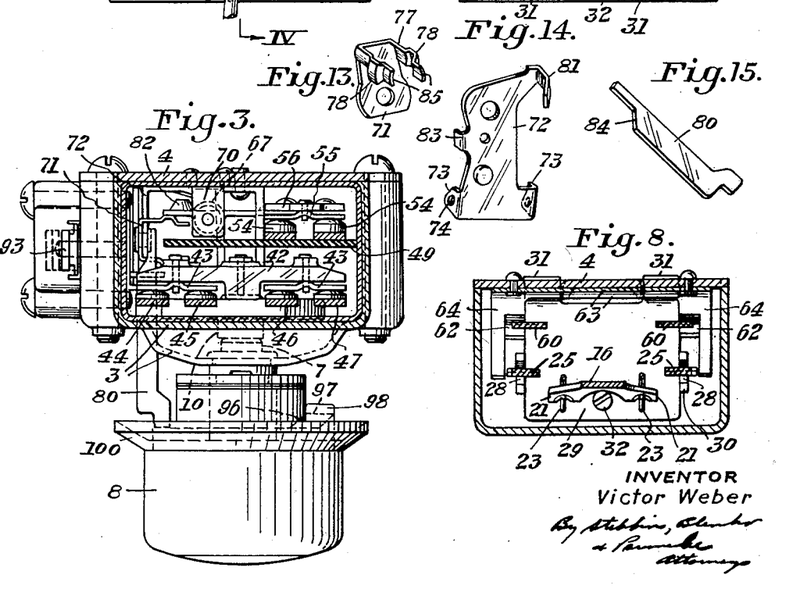
Figure 3 is a section taken along the line III—III of Figure 1.
Figure 8 is a section taken along the line VIII—VIII of Figure 5.
Figure 13 is a perspective view of the operating link extending between the contact arm and the broil lever.
Figure 14 is a perspective view of the resetting link for appropriately positioning the broil lever.
Figure 15 is a perspective view of the arm for manual operation of the bake and broil switch mechanisms.

It will be noted that in the embodiment shown in Figures 3 and 4 the adjusting dial is spaced a substantially greater distance from the front cover of the housing than in the structure shown in Figure 7. It will be apparent that the adjusting dial can be spaced any suitable distance from the front cover so as to permit a variety of mountings on the range.

While I have shown and described a preferred embodiment of my invention, it will be understood that I do not intend to be limited thereby and that my invention may be otherwise embodied within the scope of the appended claims.

I claim:

1. A heat control system for a stove or the like having a broil element and a bake element adapted to be connected to a power source comprising switch mechanism in the broil element circuit, switch mechanism in the bake element circuit, a thermostatic device responsive to the desired operating temperature, switch mechanism common to both of said circuits arranged to be operated by the thermostatic device, and control means including a single selecting and adjusting handle for actuating at least one of said switch mechanisms to cause both the bake element and the broil element to be connected to the power source at the same time and for otherwise selecting the elements to be connected to the power source and the desired operating temperatures.

2. In a heat control system for a stove or the like, the combination of a broil element and a bake element adapted to be connected to a power source, means for causing both of said elements to be selectively connected to the power source at the same time during a heating operation, a thermostatic device for controlling the operation of at least one of said elements, and means automatically operable by said thermostatic device during the heating operation for disconnecting one of said elements from the power source and for maintaining it disconnected from the power source while permitting the other of said elements to continue to operate under control of the thermostatic device during the balance of the heating operation.

3. In a heat control system for a stove or the like, the combination of a broil element and a bake element adapted to be electrically connected to a power source, switch mechanism common to the circuits for both of said elements, a thermostatic device adjustable to operate the switch mechanism at any desired operating temperature, broil element switch mechanism for controlling the operation of the broil element, bake element switch mechanism for controlling the operation of the bake element, said switch being normally urged to closed position, manual means for closing the broil element switch mechanism to place in operation both the bake element and the broil element and means for automatically opening the broil element switch mechanism upon movement of the common switch mechanism to open position.

4. In a heat control system for a stove or the like, having a broil element and a bake element adapted to be connected to a power source the combination of switch mechanism in the broil element circuit, switch mechanism in the bake element circuit, thermostatic means responsive to the temperatures to be controlled, and means actuated by the thermostat during the continuance of a heating operation for disconnecting the broil element from the power source during the remainder of the heating operation and for maintaining it disconnected from the power source while permitting the bake element to continue in operation during the balance of the heating operation.

5. A heat control system for a stove or the like having a broil element and a bake element adapted to be connected to a power source comprising switch mechanism in the broil element circuit, switch mechanism common to both circuits, a thermostat responsive to temperatures to be controlled, and means cooperating with the thermostat for actuating the common switch mechanism and the broil element switch mechanism, whereby the broil element may be disconnected from the power source during the continuance of the heating period.

6. In a heat control system of the character described, the combination of a broil element, a bake element, means for connecting the elements to a power source, switch mechanism in each of the circuits leading to said elements, switch mechanism common to both of said circuits, a single thermostat responsive to the temperatures to be controlled and means actuated by the thermostat for operating the common switch mechanism to open and closed positions purusant to temperature changes and for operating the broil element switch mechanism to open position at a predetermined temperature during the continuance of the heating operation.

7. In a heat control system for a stove or the like having a broil element and a bake element adapted to be connected to a power source, the combination of thermostatic means for controlling the operating temperatures for both elements, thermostatic switch mechanism operated by said thermostatic means for disconnecting said elements from the power source, switch mechanism in the broil element circuit arranged to be operated by said thermostat at any desired temperature, and connecting means between the broil element switch and said thermostat for moving the broil element switch to open position at the desired temperature and for maintaining it in open position during the continuance of the heating operation, the bake element remaining under control of the thermostat.

8. A heat control system of the character described in claim 7 including a switch in the bake element circuit, said switch mechanism being arranged to permit both the broil element switch and the switch in the bake element circuit to be connnected to the power source at the same time.

9. In a heat control system for a stove or the like having a broil element and a bake element adapted to be connected to a power source, the combination of thermostatic means for controlling the operating temperatures for both elements, thermostatically actuated switch mechanism common to both elements, switch mechanism in the broil element circuit, means interconnecting the broil element switch mechanism and the thermostatically actuated switch mechanism for actuating the broil element switch to open position upon movement of the thermostatically actuated switch mechanism by the thermostat to open position, and an operating handle for manually adjusting the thermostatic means and for moving the broil element switch mechanism to closed position.

10. In a heat control system for a stove or the like having a broil element and a bake element adapted to be connected to a power source, the combination of a thermostat having an adjusting handle for regulating operating temperatures, switch mechanism in the bake element circuit, switch mechanism in the broil element circuit, switch mechanism common to both circuits arranged to be actuated to closed and open positions by the thermostat, and disengageable means interconnecting the common switch mechanism and the broil element switch mechanism for causing the common switch mechanism to operate the broil element switch mechanism upon movement of the common switch mechanism to open position by the thermostat.

11. In a heat control system for a stove or the like having a broil element and a bake element adapted to be connected to a power source, the combination of a thermostat having an adjusting handle for regulating operating temperatures, switch mechanism in the bake element circuit, switch mechanism in the broil element circuit, switch mechanism common to both circuits arranged to be actuated to closed and open positions by the thermostat, and disengageable means interconnecting the common switch mechanism and the broil element switch mechanism for causing the common switch mechanism to operate the broil element switch mechanism as desired, said control handle being arranged to select any desired switch mechanism arrangement and to set the thermostat at the desired operating temperature.

12. In a heat control system for a stove or the like having a broil element and a bake element adapted to be connected to a power source, a thermostat for controlling operating temperatures, thermostatic switch mechanism, separate switch mechanisms in the bake and broil element circuits, a control handle for adjusting the thermostat to the desired setting, and means actuated by the control handle for closing the thermostatic switch mechanism and both the broil element switch mechanism ant the bake element switch mechanism for simultaneous operation of both of said elements, said means being arranged to automatically actuate the broil element switch mechanism to a different position and maintain it in that position upon the initial movement of the thermostatic switch to open position by the thermostat during the heating operation.

13. In a heat control system for a stove or the like having a broil element and a bake element adapted to be connected to a power source, the combination of adjustable thermostatic means for controlling operating temperatures, switch mechanism common to both the bake and broil element circuits arranged to be operated by the thermostat, separate switch mechanisms in the broil element and bake element circuits, means for selectively closing either or both of said broil and bake element switch mechanisms, a single adjusting dial for operating said switch mechanisms and for adjusting the thermostat, and a connection between the broil element switch mechanism and the common switch mechanism for moving the broil element switch mechanism to open position upon movement of the common switch mechanism to open position by the thermostat.

14. In a heat control system for a stove or the like having a broil element and a bake element adapted to be connected to a power source, the combination of adjustable thermostatic means for controlling operating temperatures, switch mechanism common to both the bake and broil element circuits arranged to be operated by the thermostat, separate switch mechanisms in the broil element and bake element circuits, means for selectively closing either or both of said broil and bake element switch mechanisms, a single adjusting dial for operating said switch mechanisms and for adjusting the thermostat, and a connection between the broil element switch mechanism and the common switch mechanism for moving the broil element switch mechanism to open position upon movement of the common switch mechanism to open position by the thermostat, said connection being movable into and out of operating relation relative to said common switch mechanism.

15. In a heat control system for a stove or the like having a broil element and bake element adapted to be connected to a power source, the combination of a thermostat adapted to control operating temperatures, thermostatically actuated switch mechanism common to both the bake element and broil element circuits, switch mechanism in the broil element circuit, a connection between the broil element switch mechanism and the thermostatically actuated switch mechanism for moving the broil element switch mechanism to open position upon movement of the thermostatically actuated switch mechanism to open position, said connection being movable into and out of operating relation relative to said switch mechanisms, a single control handle for moving said connection as desired and for adjusting the thermostat to operate at any desired temperature, switch mechanism in the bake element circuit, and means actuated by said handle upon movement of the connection to inoperative position for moving the bake element switch mechanism to open position.

16. Heat control apparatus for a stove or the like comprising a broil element and a bake element adapted to be connected to a power source, a thermostat responsive to the temperatures to be controlled, toggle mechanism actuated by the thermostat for opening and closing the main circuit leading to the broil and bake elements, switch mechanism in the broil element circuit including a pivotally mounted lever, a disengageable connection between said broil element lever and said toggle mechanism for moving the broil element lever in one direction only upon operation of said toggle mechanism in a direction to open the circuit, an adjusting handle, and means actuated by the adjusting handle for moving the broil element lever in the opposite direction as desired.

17. Heat control apparatus for a stove or the like comprising a broil element and a bake element adapted to be connected to a power source, switch mechanism common to both of said elements, switch mechanism in the broil element circuit, switch mechanism in the bake element circuit, a thermostat responsive to the temperatures to be controlled, a pivotally mounted lever operated by said thermostat for opening or closing the switch mechanism common to both circuits, a pivotally mounted lever for actuating the broil switch mechanism, means for manually moving the broil element lever to a position to close the broil element switch mechanism, and a disengageable connection extending between said first-mentioned lever and said broil element lever for moving the broil element lever to a position to open the broil switch mechanism upon movement of the first-mentioned lever to a position to open the switch mechanism common to both the broil and bake elements.

18. Heat control apparatus for a stove or the like comprising a broil element and a bake element adapted to be connected to a power source, switch mechanism common to both the said elements, switch mechanism in the broil element circuit, switch mechanism in the bake element circuit, a thermostat responsive to the temperatures to be controlled, a pivotally mounted lever operated by said thermostat for opening or closing the switch mechanism common to both circuits, a pivotally mounted lever for actuating the broil switch mechanism, means for manually moving the broil element lever to a position to close the broil element switch mechanism, a disengageable connection extending between said thermostatically actuated lever and said broil element lever for moving the broil element lever to a position to open the broil switch mechanism upon movement of the thermostatically actuated lever to a position to open the switch mechanism common to both the broil and bake elements, and means actuated by said manually operated means for opening or closing the bake element switch mechanism.

19. A heat control system for a stove or the like having a broil element and a bake element adapted to be connected to a power source comprising switch mechanism in the broil element circuit, a thermostat responsive to temperatures to be controlled, switch mechanism in the bake element circuit cooperating with and actuated to open and closed position by said thermostat, means for transmitting movement from the thermostat to said broil element switch mechanism to thermostatically move said switch mechanism to a different position during the continuance of the heating operation, and a single control handle for selectively connecting the bake and broil elements to the power source for simultaneous operation and for adjusting the thermostat.

20. In a heat control system for a stove or the like having a broil element and a bake element adapted to be connected to a power source, the combination of thermostatic means for controlling the operating temperatures, thermostatically actuated switch mechanism, switch mechanism in the broil element circuit, means cooperating with the broil element switch mechanism and actuated upon movement of said thermostatic means in a direction to open the thermostatic switch mechanism for operating the broil element switch mechanism during the continuance of the heating operation, and an operating handle for manually adjusting the thermostatic means and for moving the broil element switch mechanism to closed position.

21. A heat control system for a stove or the like having a broil element and a bake element adapted to be connected to a power source comprising switch mechanism in the broil element circuit, switch mechanism in the bake element circuit, a thermostat responsive to the temperatures to be controlled, thermostatic switch mechanism actuated by said thermostat, and means adapted to move the broil element switch mechanism to open position upon movement of the thermostatic switch mechanism to open position and for maintaining it in open position during the continuance of the heating operation, the thermostatic switch remaining under control of the thermostat during the continuance of the heating operation.

22. In a heat control system for a stove or the like, the combination of a broil element and a bake element adapted to be electrically connected to a power source, switch mechanism common to the circuits for both of said elements, a thermostatic device adjustable to operate the switch mechanism at any desired operating temperature, broil element switch mechanism for controlling the operation of the broil element, bake element switch mechanism for controlling the operation of the bake element, manual means for closing the broil element switch mechanism to place in operation both the bake element and the broil element, and means actuated by the thermostatic device for automatically opening the broil element switch mechanism.

23. A heat control system for a stove or the like having a broil element and a bake element adapted to be connected to a power source comprising switch mechanism in the broil element circuit, switch mechanism in the bake element circuit, switch mechanism common to both circuits, a thermostat responsive to temperatures to be controlled, and means cooperating with the thermostat for actuating the common switch mechanism and the broil element switch mechanism, whereby the broil element may be disconnected from the power source while the bake element switch mechanism remains closed during the continuance of the heating period.

24. In a heat control system for an electric heating appliance having a heating element adapted to be connected to a power source, the combination of switch mechanism in the circuit of said heating element, a thermostat having an element responsive to temperatures in said heating appliance and an adjusting dial for adjusting the thermostat to respond to the desired temperature, and mechanism including connections between said thermostat and said switch mechanism for closing said switch mechanism upon rotation of said adjusting dial and for automatically opening said switch mechanism by the operation of said thermostat, said connections including a disengageable member for rendering the thermostat inoperative to thereafter actuate said switch mechanism until the adjusting dial is manually reset for a subsequent heating operation.

25. In a temperature regulator for an electric heating appliance including two independent heating elements, the combination of a switch for each element for controlling the supply of current thereto, thermo-responsive mechanism for controlling the switches including an element responsive to temperature changes in the appliance, a handle for adjusting said mechanism to different temperature settings, said mechanism being operable manually on rotation of the handle from an off position to an intermediate position to close both of said switches, and means responsive to subsequent opening of one switch upon thermostatic operation of said mechanism for maintaining the switch in its open position out of the influence of said mechanism while the other switch remains under control of the mechanism.

26. In a temperature regulator for an electric heating appliance including two independent heating elements, the combination of a switch for each element for controlling the supply of current thereto, thermo-responsive mechanism for controlling the switches including an element responsive to temperature changes in the appliance, a handle for adjusting said mechanism to different temperature settings, said mechanism being operable manually on rotation of the handle from an off position to an intermediate position to close both of said switches, and means responsive to subsequent opening of one switch upon thermostatic operation of said mechanism for maintaining the switch in its open position out of the influence of said mechanism while the other switch remains under control of the mechanism, and means operable on rotation of the handle to a point beyond an intermediate position for maintaining said first switch in its closed position irrespective of the operation of said thermo-responsive mechanism.

27. In a temperature regulator for an electric heating appliance including two independent heating elements, the combination of a switch for each element for controlling the supply of current thereto, thermo-responsive mechanism for controlling the switches including an element responsive to temperature changes in the appliance, a handle for adjusting said mechanism to different temperature settings, said mechanism being operable manually on rotation of the handle from an off position to an operating position to close both of said switches, and means responsive to subsequent opening of one switch upon thermostatic operation of said mechanism for maintaining the switch in its open position out of the influence of said mechanism while the other switch remains under control of the mechanism.

28. In a temperature regulator for an electric heating appliance including two independent heating elements adapted to be connected to a power source, the combination of a switch for each element for controlling the supply of current thereto, an element responsive to temperature changes in the appliance, mechanism operable by said last element for controlling the switches, a temperature adjustment handle for varying the response of the mechanism to operation of the thermo-responsive element and movable from an off position to one position to cause both switches to close, locking means responsive to subsequent opening of the switches by said mechanism for rendering one of the switches inoperable by the mechanism, and means operable by movement of the handle to other positions to selectively connect either of said elements to the power source while subject to the operation of said thermally responsive mechanism.

29. In a control mechanism for a pair of independent switches, the combination of thermo-responsive actuating means for the switches, a handle for adjusting said means to different temperature settings, means actuated on movement of the handle from an off position to a position to close both switches, and means responsive to opening of one of the switches by the actuating means for locking said switch in its open position out of the influence of the actuating means while the other switch remains under control of the actuating means.

30. An electrical heating system for an oven comprising a source of electric energy, an upper oven heating unit primarily for broiling purposes, a lower oven heating unit primarily for baking purposes, a manually selective control means having one position for initially connecting both of said units to said source to provide the combined heat output of said units for preheating purposes, said control means having a second position for initially connecting said lower unit to said source for baking purposes, a thermostat for disconnecting both of said units from said source, and means effective when the control means is set for initially connecting both of said units to said source for disconnecting said upper unit from said source for the remainder of the heating period when the thermostat opens but connecting the lower unit to said identical source when the thermostat recloses.

31. An electrical heating system for an oven comprising a source of electrical energy, an upper oven heating unit primarily for broiling purposes, a lower oven heating unit primarily for baking purposes, a manually settable control means having a single operating knob, means cooperating with said knob for indicating various oven temperatures as well as a preheat position, said control means having means effective when said knob is set only to one of the various oven temperatures for connecting only said lower oven heating unit to said source, said control means also having means effective when said knob is first turned to said preheat position and then to one of the various oven temperatures for first connecting both said upper and lower units to said source and then disconnecting the upper unit from said source after the oven has been preheated.

32. An electrical heating system for an oven comprising a source of electric energy, an upper oven heating unit primarily for broiling purposes, a lower oven heating unit primarily for baking purposes, a manually selective control means operable by movement to two positions for initially connecting both of said units to said source to provide the combined heat output of said units for preheating purposes, said control means being operable by movement to one position for initially connecting said lower unit to said source for baking purposes, and temperature responsive means effective when the control means has been initially set to said two positions for disconnecting the upper unit from said source upon the oven reaching the desired temperature and for maintaining it disconnected during the succeeding heating operation, the other unit remaining under control of said temperature responsive means.

33. In a heat control system for a stove or the like having a broil element and a bake element adapted to be connected to a power source, the combination of thermostatic means for controlling the operating temperatures, thermostatically actuated switch mechanism, switch mechanism in the broil element circuit, means cooperating with the broil element switch mechanism and automatically actuated upon movement of said thermostatic means in a direction to open the thermostatic switch mechanism for operating the broil element switch mechanism to a different position and for holding it in such position during the continuance of the heating operation, and an operating handle for manually adjusting the thermostatic means and for moving the broil element switch mechanism to closed position.

34. A temperature regulating device for electric ovens and the like having broil and bake elements energized from a source of current, said device comprising common switch mechanism for controlling energization of the elements, separate switch mechanism for controlling energization of the broil element, separate switch mechanism for controlling energization of the bake element, a thermostat for operating said common switch mechanism and causing alternate energizing and deenergizing of the elements to maintain selected oven temperatures, means for adjusting said thermostat to different temperature settings, connecting means actuated by said common switch mechanism upon deenergizing operation of said thermostat for moving the broil switch mechanism to a different position, a reciprocable member engageable with said connecting means for displacement thereof and for causing operation of said broil switch mechanism for energization of the broil element irrespective of said thermostat operation, means for operating said bake switch mechanism for deenergization of the bake element by movement of said reciprocable member, and operating means carried by said adjusting means for moving said reciprocable member in one position of said adjusting means, said reciprocable member being ineffective to displace said connecting means in another position of said adjusting means and permitting return of said bake switch mechanism to unoperated condition and control of said broil switch mechanism by said thermostat.

35. A temperature regulating device for electric ovens and the like having broil and bake elements energized from a source of current supply, said device comprising common switch mechanism for controlling energization of the elements, separate switch mechanism for controlling energization of the broil element, separate switch mechanism for controlling energization of the bake element, a thermostat for operating said common switch mechanism and causing alternate energizing and deenergizing of the elements to maintain selected oven temperatures, means for adjusting said thermostat to diffetrent temperature settings, connecting means actuated by said common switch mechanism upon deenergizing operation of said thermostat for moving the broil switch mechanism to a different position, means for displacing said connecting means and causing operation of said broil switch mechanism for energization of the broil element irrespective of said thermostat operation, said displacing means being arranged to operate said bake switch mechanism for deenergization of the bake element concomitantly with said energization of the broil element, means effective in one position of said adjusting means for operating said displacing means, and biasing means for returning said bake element switch mechanism to its unoperated condition in another position of said adjusting means for simultaneous energization of the elements.

36. A temperature regulating device for electric ovens and the like having broil and bake elements energized from a source of current supply, said device comprising common switch mechanism for controlling energization of the elements, separate switch mechanism for controlling energization of the broil element, separate switch mechanism for controlling energization of the bake element, a thermostat for operating said common switch mechanism and causing alternate energizing and deenergizing of the elements to maintain selected oven temperatures, means for adjusting said thermostat to different temperature settings, means for operating said separate switch mechanisms to cause energization of the broil element and simultaneous deenergization of the bake element, means effective in one position of said adjusting means for causing operation of said switch operating means, means effective in another position of said adjusting means for returning said bake element switch mechanism to its unoperated condition thereby permitting simultaneous energization of the elements, and means effective upon deenergizing operation of said thermostat for operating said broil element switch mechanism and thereby causing energization of the bake element alone upon subsequent energizing operation of said thermostat while said adjusting means remains in said other position.

VICTOR WEBER.